United States Patent
Norman et al.

(10) Patent No.: US 11,660,700 B2
(45) Date of Patent: May 30, 2023

(54) WELDING AND DEBURRING SYSTEM WITH CRYOGENIC COOLING

(71) Applicant: DUS Operating Inc., Auburn Hills, MI (US)

(72) Inventors: James R. Norman, New Baltimore, MI (US); Yingchun Chen, Coventry (GB); Samantha Lynne DesRochers, Clawson, MI (US); Lenny Vanneste, Chesterfield, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 0 days.

(21) Appl. No.: 17/339,282

(22) Filed: Jun. 4, 2021

(65) Prior Publication Data

US 2022/0388091 A1 Dec. 8, 2022

(51) Int. Cl.
  *B23K 20/00* (2006.01)
  *B23K 20/12* (2006.01)

(52) U.S. Cl.
  CPC ................................ *B23K 20/1255* (2013.01)

(58) Field of Classification Search
  CPC ............... B23K 20/1255; B23K 20/26; B23K 20/1215; B23K 37/08; B23K 20/1235; B23K 20/1245
  See application file for complete search history.

(56) References Cited

U.S. PATENT DOCUMENTS

| | | | |
|---|---|---|---|
| 6,516,992 B1 | 2/2003 | Colligan | |
| 8,910,851 B2* | 12/2014 | Rosal | B23K 20/1255 228/2.1 |
| 9,352,425 B2* | 5/2016 | Rosal | B23K 20/1255 |
| 2001/0054639 A1 | 12/2001 | Gabzdyl | |
| 2003/0111515 A1 | 6/2003 | Scheglmann et al. | |
| 2005/0006438 A1 | 1/2005 | Andersson et al. | |
| 2009/0014422 A1 | 1/2009 | Miklos et al. | |
| 2009/0166395 A1 | 7/2009 | Nakata et al. | |
| 2010/0038405 A1 | 2/2010 | Garner | |
| 2013/0068825 A1* | 3/2013 | Rosal | B23K 37/08 228/2.1 |
| 2015/0097020 A1* | 4/2015 | Rosal | B23K 20/1215 228/2.1 |
| 2019/0314927 A1* | 10/2019 | Ohashi | B23K 20/1235 |

FOREIGN PATENT DOCUMENTS

| | | |
|---|---|---|
| EP | 1425133 B9 | 6/2010 |
| JP | 4774253 B2 | 9/2011 |
| WO | 1999060079 A2 | 11/1999 |
| WO | 2001085385 A1 | 11/2001 |
| WO | PCTUS2231879 | 6/2022 |

* cited by examiner

*Primary Examiner* — Erin B Saad
(74) *Attorney, Agent, or Firm* — Vivacqua Crane PLLC

(57) ABSTRACT

A welding and deburring system is provided for joining first and second work pieces to one another. The system includes a friction stir welding tool for joining the first and second work pieces to one another at a weld. The system further includes a deburring tool attached to the friction stir welding tool and removing a material flash generated at the weld. The system further includes one or more nozzles disposed in a fixed position relative to the friction stir welding tool, with the nozzles directing a cryogenic fluid to at least one of the friction stir welding tool, the deburring tool, the first work piece, the second work piece, and the weld.

13 Claims, 4 Drawing Sheets

WELDING AND DEBURRING SYSTEM WITH CRYOGENIC COOLING

FIELD

The present disclosure relates to friction stir welding, and more particularly, to a system with cryogenic cooling for simultaneously welding two parts together and removing material flash.

BACKGROUND

Friction stir welding (FSW) is a technology that has been developed for welding metals and metal alloys. FSW is generally a solid state process that temporarily transforms metal into a plasticized state that typically does not include a liquid phase. However, in other applications, FSW may include one or more elements passing through a liquid phase. An FSW tool typically includes a shoulder and a pin extending from the shoulder, and the FSW process often includes adjoining work two pieces on either side of a joint by plunging the pin into the joint and rotating the pin. More specifically, the pin and the work pieces are forced together, and the interaction between the pin, the shoulder, and the work pieces generates frictional heat, which in turn plasticizes the material on either side of the joint. The pin and the shoulder are traversed along the joint for plasticizing material, and the plasticized material cools to form a weld or bead.

FSW has evolved from being used on aluminum or other metals having a low melting temperature to materials having a comparably higher melting temperature, such as steel, stainless steel, nickel base alloys and others. Once a friction stir weld or friction stir processing pass is complete, the starting point of the joint may be left with material flash caused by the initial tool plunge. In many applications, flash and burrs on work pieces is unacceptable. In a separate deburring application after FSW is complete and the weld passively cools to the ambient temperature, a deburring tool may be used to remove the flash and burrs. However, the cooling period and separate deburring process can increase the overall manufacturing cycle time and costs associated therewith.

Accordingly, there is a need for a system that simultaneously welds and removes flash from work pieces.

SUMMARY

According to several aspects, a welding and deburring system is provided for joining first and second work pieces to one another. The system includes a friction stir welding tool ("FSW tool") for joining the first and second work pieces to one another at a weld. The system further includes a deburring tool attached to the FSW tool. The deburring tool removes a material flash generated at the weld, in response to the FSW tool joining the first and second work pieces together. The system further includes one or more nozzles disposed in a fixed position relative to the FSW tool, with the nozzles directing a cryogenic fluid to at least one of the FSW tool, the deburring tool, the first work piece, the second work piece, and the weld.

In one aspect, the FSW tool includes a shoulder having a shoulder tip and a probe extending from the shoulder tip. The FSW tool further includes a first collar disposed about the shoulder.

In another aspect, the deburring tool includes a second collar that is disposed about the first collar and pivotally coupled to the first collar. The deburring tool further includes one or more cutting inserts releasably coupled to the second collar, such that the cutting inserts engage the first and second work pieces during friction stir welding for removing the material flash.

In another aspect, the deburring tool further includes a pair of rocker pins attaching the second collar to the first collar, such that the second collar remains parallel to a surface of the first and second work pieces while the FSW tool and the first collar operate at an angle that is not perpendicular to the surface.

In another aspect, the rocker pins are disposed through at least the first and second collars, and the rocker pins are positioned diametrically opposite to one another, such that the second collar is free to pivot on the rocker pins relative to the first collar.

In another aspect, the deburring tool further includes a load pin coupled to a working end of the second collar for engaging the surface of at least one of the first and second work pieces and setting a cutting depth of the cutting inserts into the first and second work pieces.

In another aspect, the cutting insert is replaceable.

According to several aspects, a welding and deburring system is provided for joining first and second work pieces to one another. The system includes a FSW tool for joining the first and second work pieces to one another at a weld. The system further includes a deburring tool attached to the FSW tool. The deburring tool removes a material flash generated at the weld, in response to the FSW tool joining the first and second work pieces together. The system further includes one or more nozzles disposed in a fixed position relative to the FSW tool, with the nozzles directing a cryogenic fluid to at least one of the FSW tool, the deburring tool, the first work piece, the second work piece, and the weld. The system further includes a storage tank for storing the cryogenic fluid. The system further includes a pump for pumping the cryogenic fluid from the storage tank to the nozzles, with the pump including an inlet and one or more outlets. The system further includes a liquid supply line for fluidly connecting the storage tank to the inlet of the pump. The system further includes one or more vapor supply lines for fluidly connecting the outlets of the pump to an associated one of the nozzles. The system further includes a valve coupled to at least one of the liquid supply line and the vapor supply lines, with the valve being movable between a closed position and an open position for flowing the cryogenic fluid from the storage tank to the nozzles. The system further includes a computer having a processor coupled to the pump and the valve. The computer further includes a memory having instructions such that the processor is programmed to generate an actuation signal. The valve moves to the open position, and the pump pumps the cryogenic fluid from the storage tank to the nozzles, in response to the pump receiving the actuation signal from the processor.

In one aspect, the FSW tool includes a shoulder having a shoulder tip and a probe extending from the shoulder tip. The FSW tool further includes a first collar disposed about the shoulder.

In another aspect, the deburring tool includes a second collar disposed about the first collar and pivotably coupled to the first collar. The deburring tool further includes one or more cutting inserts releasably coupled to the second collar, such that the cutting inserts engage the first and second work pieces during friction stir welding for removing the material flash.

In another aspect, the deburring tool further includes a pair of rocker pins for attaching the second collar to the first collar, such that the second collar remains parallel to a surface of the first and second work pieces while the FSW tool and the first collar operate at an angle that is not perpendicular to the surface.

In another aspect, the rocker pins are disposed through at least the first and second collars, and the rocker pins are positioned diametrically opposite to one another, such that the second collar is free to pivot on the rocker pins relative to the first collar.

In another aspect, the deburring tool further includes a load pin coupled to a working end of the second collar for engaging the surface of at least one of the first and second work pieces and setting a cutting depth of the cutting insert into the first and second work pieces.

In another aspect, the cutting insert is replaceable.

According to several aspects, a method is provided for operating a welding and deburring system having an FSW tool, a deburring tool coupled to the FSW tool, and one or more nozzles disposed in a fixed position relative to the FSW tool. The method includes the FSW tool joining first and second work pieces to one another at a weld. The method further includes one nozzles applying a cryogenic fluid to at least one of the FSW tool, the deburring tool, the first work piece, the second work piece, and the weld. The method further includes the deburring tool removing a material flash from at least one of the weld and the first and second work pieces.

In one aspect, the method further includes rotating a first collar of the FSW tool and rotating a second collar of the deburring tool, with the second collar disposed about the first collar. The method further includes pivoting the second collar relative to the first collar, such that the second collar is disposed parallel to the first and second work pieces.

In another aspect, the method further includes pivoting the second collar on a pair of rocker pins, which are in turn coupled to a pair of diametrically sides of the first collar.

In another aspect, a load pin that is coupled to the second collar sets a cutting depth of one or more cutting inserts attached to the second collar.

In another aspect, one or more cutting inserts are replaced with an associated replacement cutting insert.

In another aspect, the method further includes using the FSW tool to perform at least one of friction stir processing, friction stir spot welding, friction stir spot joining, friction bit joining, friction stir fabrication, and friction stir mixing, for joining the first and second work pieces to one another.

Further areas of applicability will become apparent from the description provided herein. It should be understood that the description and specific examples are intended for purposes of illustration only and are not intended to limit the scope of the present disclosure.

DETAILED DESCRIPTION

Figure 1:
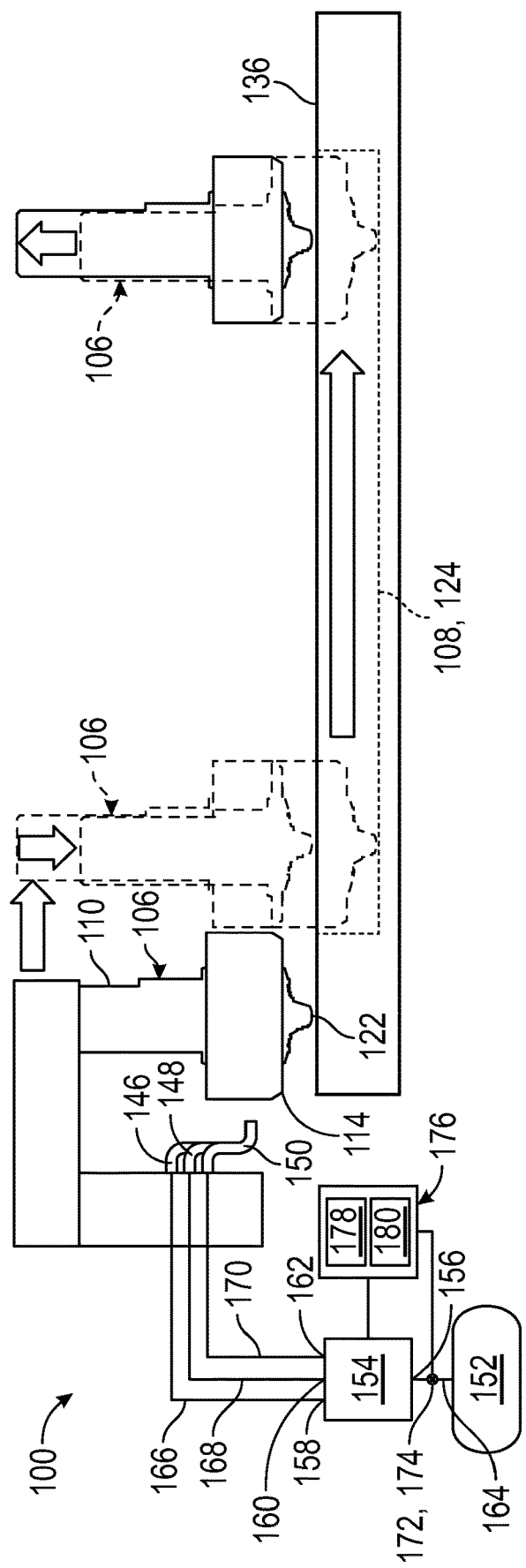
FIG. 1 is a schematic side view of one example of a welding and deburring system, illustrating the system having a friction stir welding tool ("FSW tool") for joining two work pieces to one another at a weld, a deburring tool for removing material flash from the work pieces, and a coolant system for cooling at least one of the FSW tool, the deburring tool, the weld, and the first and second work pieces.
Figure 2:
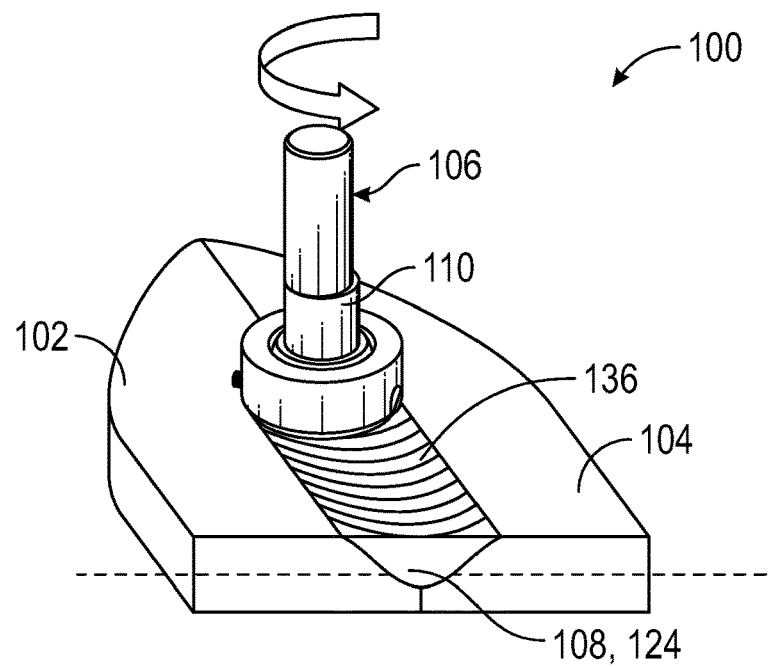
FIG. 2 is an enlarged perspective view of the FSW tool of FIG. 1.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIGS. 1 and 2, one example of a welding and deburring system 100 ("system") is provided for joining first and second work pieces 102, 104 (FIG. 2) to one another. The system 100 includes a friction stir welding tool 106 ("FSW tool") for joining the first and second work pieces 102, 104 to one another at a weld 108 or bead. High machine loads can be required for FSW geometry, and an undesirable deflection of the FSW tool 106 can create a natural tilt of a spindle 110 (FIG. 1) that is rotating the FSW tool 106. As described in detail below, this non-limiting example of the system 100 includes a floating double collar configuration with first and second collars 112, 114 (FIGS. 3 and 4) that permit a deburring tool 126, as described below, to remove material flash and burrs when the FSW tool 106 is tilted relative to the surface of the first and second work pieces 102, 104. However, it is contemplated that other examples of the system may not include the floating double collar configuration having the first and second collars.

Figure 3:
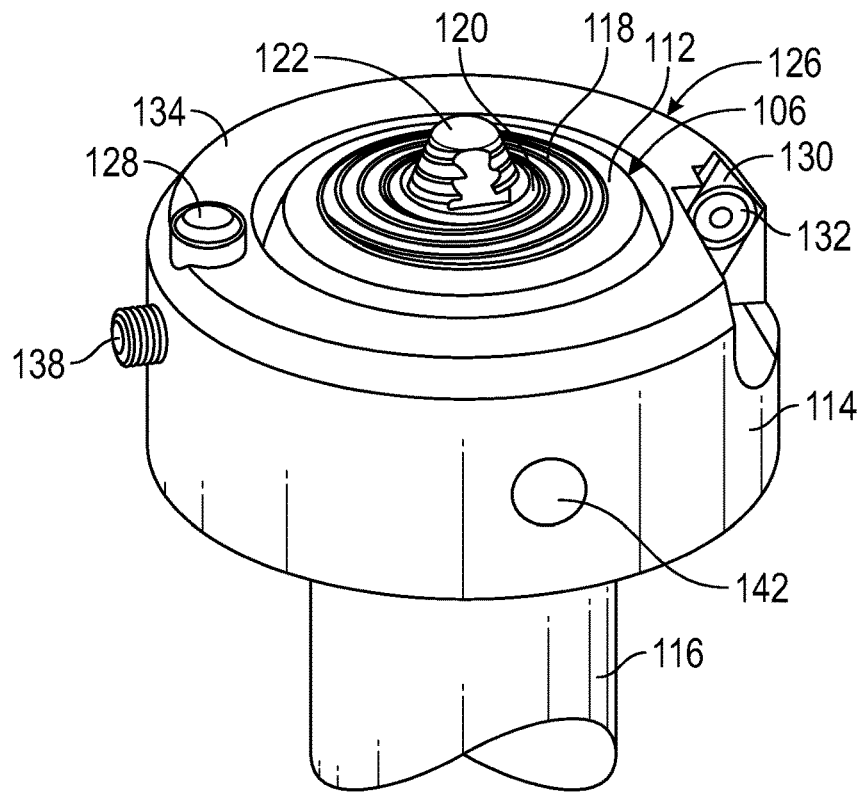
FIG. 3 is an enlarged bottom perspective view of a working end of the FSW tool of FIG. 1.
Figure 4:
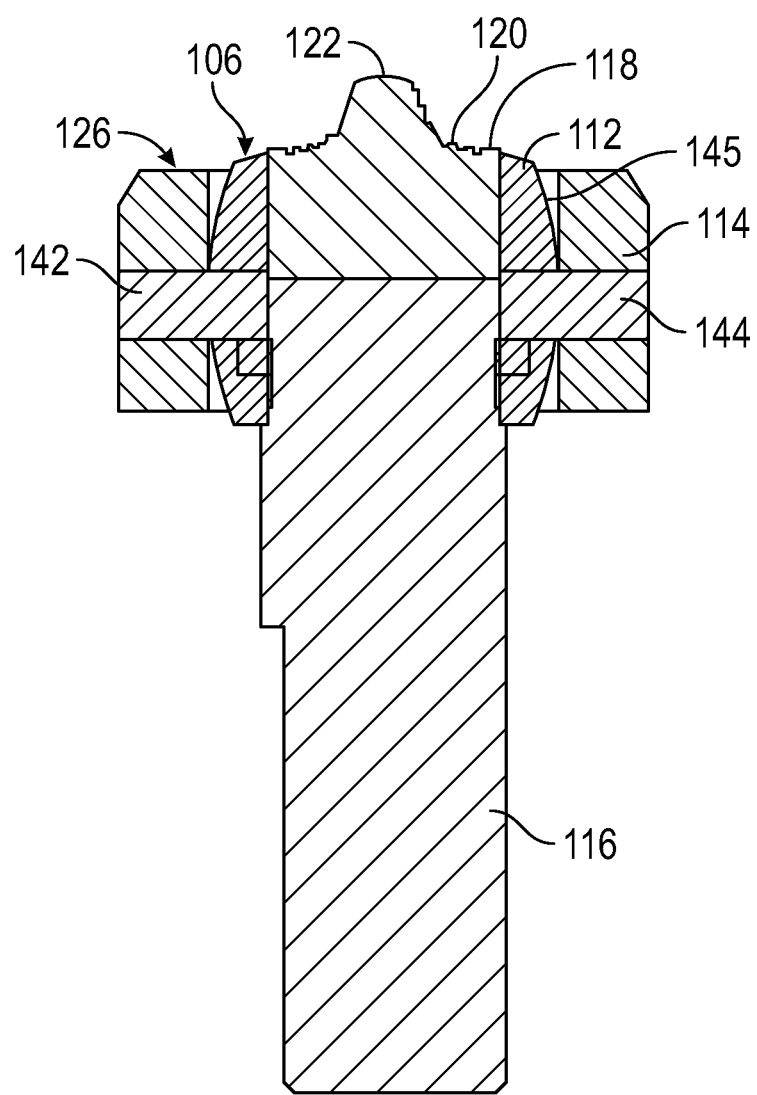
FIG. 4 is a cross-sectional view of the FSW tool of FIG. 3.

As shown in FIGS. 3 and 4, the FSW tool 106 includes a shank 116, a shoulder 118 that extends from the shank 116 and terminates at a shoulder tip 120, a pin 122 that extends from the shoulder tip 120, and a first collar 112 disposed about the shoulder 118. The pin 122 is rotated against a joint line 124 between the first and second work pieces 102, 104 until sufficient heat is generated, at which point the pin 122 is plunged into the first and second work pieces 102, 104 and the shoulder 118 engages the work pieces 102, 104 to prevent further penetration. The first and second work pieces 102, 104 can be two sheets or plates that are butted together at the joint line 124 (FIG. 2). It should be understood that the FSW tool 106 may have many different profiles and still include some surface modification of the FSW tool 106 and/or the deburring tool 126. Accordingly, it is within the scope of the invention that the FSW tool may not include a pin on the shoulder, or there may be a retractable pin or a standard pin. The pin may also have any pin profile that is desirable for the particular application of the FSW tool. It is further contemplated that the shoulder can have any suitable profile, including a stepped profile, a spiraled profile, a concave profile, a convex profile or any other desirable profile.

The rotational motion of the pin 122 against the first and second work pieces 102, 104 generates frictional heat, that in turn causes the material to soften without reaching a melting point. The FSW tool 106 is moved transversely along the joint line 124, thereby creating the weld 108 or bead as the plasticized material flows around the pin 122 from a leading edge to a trailing edge along the joint line 124. The result is a solid phase bond at the joint line 124 that may be generally indistinguishable from the material of the first and second work pieces 102, 104. When the shoulder 118 contacts the surface of the first and second work pieces 102, 104, its rotation creates additional frictional heat that plasticizes a larger cylindrical column of material around the inserted pin 122. The FSW tool 106 provides a continual hot working action, plasticizing metal within a narrow zone as it moves transversely along the base metal, while transporting metal from the leading edge of the pin 122 to its trailing edge. As the weld zone cools, there is typically no solidification as no liquid is created as the FSW tool 106 passes. It is often the case, but not always, that the resulting weld is a defect-free, re-crystallized, fine grain microstructure formed in the area of the weld 108. The shoulder 118 provides a forging force that contains at least a portion of upward metal flow caused by the tool pin 122. However, the shoulder may not contain a portion of the upward metal flow, which can create the material flash and burrs.

The system 100 further includes a deburring tool 126, which is attached to the FSW tool 106 and configured to remove the material flash and burrs generated at the weld 108 during FSW. The deburring tool 126 includes a second collar 114 disposed about the first collar 112 and pivotably coupled to the first collar 112. The deburring tool 126 further includes one or more cutting inserts 130 (FIG. 3) releasably coupled to the second collar 114, such that the cutting inserts 130 engage the first and second work pieces 102, 104 to remove the material flash and burs during FSW. More specifically, the cutting inserts 130 remove the detrimental flash and burrs created when the FSW tool 106 plunges into the first and second work pieces 102, 104 and/or when the FSW tool 106 travels along the joint line 124.

Referring to FIG. 3, one cutting insert 130 can be attached to an outside diameter of the second collar 114. In other examples, two or more cutting inserts can be attached to any suitable portion of the second collar, other portions of the deburring tool, or the FSW tool. Each cutting insert 130 is attached to the second collar 114 using a threaded fastener 132, such that the cutting inserts 130 may be replaced if worn or broken. However, it is contemplated that the FSW tool 106 may be operated with or without the cutting inserts 130. Accordingly, the cutting inserts may or may not be a permanent fixture of the FSW tool 106. The cutting inserts 130 may be a single material with a cutting edge, or it may be reinforced using additional materials or layers.

The deburring tool 126 further includes a load pin 128 coupled to a working end 134 of the second collar 114 for engaging a surface 136 (FIGS. 1 and 2) of at least one of the first and second work pieces 102, 104 and setting a cutting depth of the cutting inserts 130 into the first and second work pieces 102, 104. In this example, the load pin 128 may remain in contact with the surface 136 of the first and second work pieces 102, 104 during FSW, which may offset the loads applied by the cutting insert 130. However, in another example where the system does not simultaneously perform FSW and deburring and where deburring occurs only after FSW has been completed, it is contemplated that the load pin may be spaced from the first and second pieces during FSW.

The deburring tool 126 further includes a cutting height adjustment screw 138 disposed underneath the load pin 128 for adjusting the height of the load pin 128 and holding the load pin 128 in a fixed position on the second collar 114. The cutting height adjustment screw 138 may be an integral part of the load pin 128 or it may be separate. Prior to FSW, a technician can operate the screw 138 to adjust the height of the load pin. In other examples, the deburring tool may not include the cutting height adjustment screw.

Referring to FIG. 4, the deburring tool 126 further includes a pair of rocker pins 142, 144 for attaching the second collar 114 to the first collar 112 in the floating double collar configuration, such that the second collar 114 remains parallel to a surface 136 (FIG. 2) of the first and second work pieces 102, 104 while the FSW tool 106 and the first collar 112 operate at an angle that may not be perpendicular to the surface 136. The rocker pins 142, 144 are disposed through at least the first and second collars 112, 114 and positioned diametrically opposite to one another, such that the second collar 114 is free to pivot on the rocker pins 142, 144 relative to the first collar 112. An outer surface 145 of the first collar 112 may be spherical to provide clearance for the second collar 114 to continuously rock about the rocker pins 142, 144. This floating double collar configuration enables the second collar 114 to remain parallel to a surface of the first and second work pieces 102, 104 at all times during FSW, e.g. when the shank 116 of the FSW tool 106 is disposed at a non-orthogonal angle with respect to the surface 136 of the first and second work pieces 102, 104. In other words, the second collar 114 remains substantially parallel to the surface 136 of the first and second work pieces 102, 104 while the FSW tool 106 and the first collar 112 are free to move and operate at an angle that is not perpendicular to the surface 136 of the first and second work pieces 102, 104.

Figure 5:
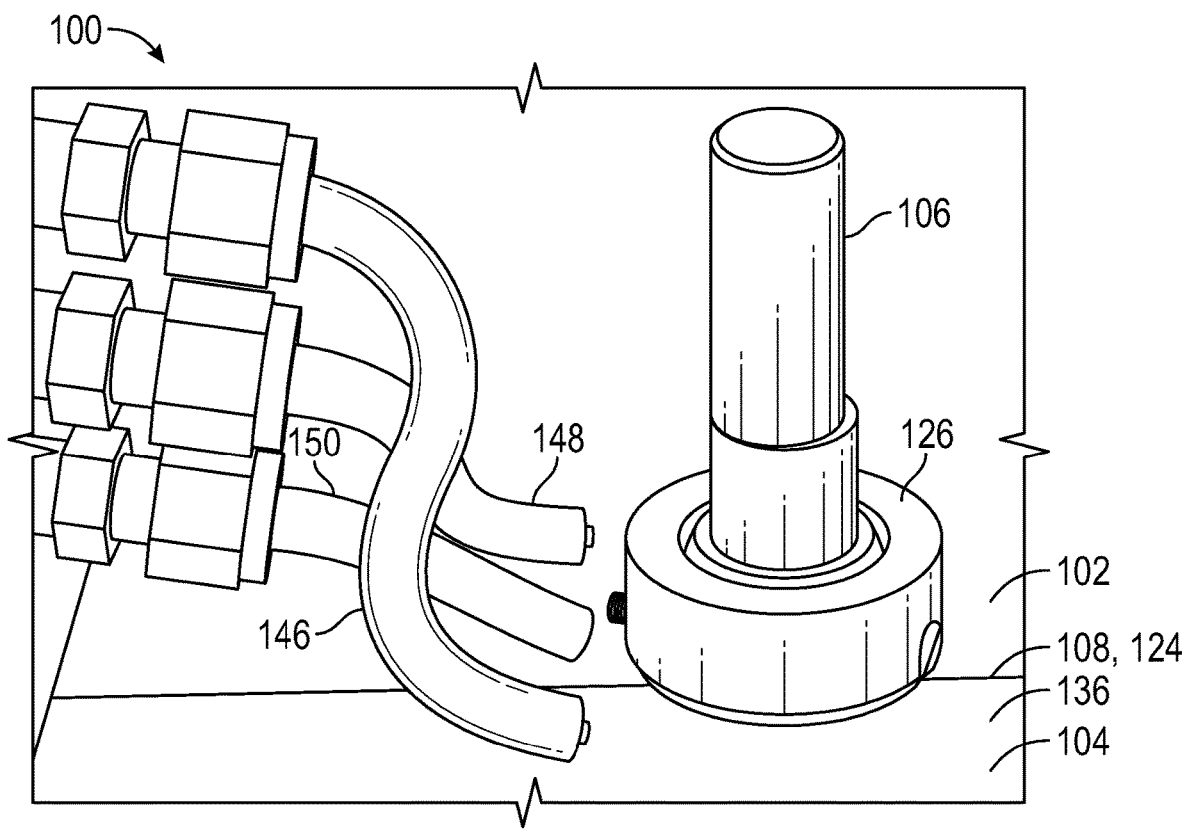
FIG. 5 is an enlarged perspective view of the FSW tool and the deburring tool, with the system including one or more nozzles for delivering cryogenic fluid to the FSW tool, the deburring tool, the weld, and the first and second work pieces.

Referring to FIG. 5, the system 100 further includes one or more nozzles 146, 148, 150 disposed in a fixed position relative to the FSW tool 106, with the nozzles 146, 148, 150 directing a cryogenic fluid to at least one of the FSW tool 106, the deburring tool 126, the first work piece 102, the second work piece 104, and the weld 108. As but one example, the nozzles 146, 148, 150 can be directed to a respective one of the second work piece 104, the first work piece 102, and the weld 108.

Referring back to FIG. 1, the system 100 further includes a storage tank 152 for storing the cryogenic fluid and a pump 154 for pumping the cryogenic fluid from the storage tank 152 to the nozzles 146, 148, 150. The pump 154 includes an inlet 156 and one or more outlets 158, 160, 162. The system 100 further includes a liquid supply line 164 that fluidly connects the storage tank 152 to the inlet 156 of the pump 154. The system 100 further includes one or more vapor supply line 166, 168, 170 that fluidly connect an associated one of the outlets 158, 160, 162 of the pump 154 to an associated one of the nozzles 146, 148, 150. In one non-limiting example, the cryogenic fluid may be liquid nitrogen. Due to the low temperatures associated with commonly available cryogenic fluids, one or more of the supply lines may be vacuum jacketed. While the foregoing example is described with liquid nitrogen as the cryogenic fluid, the system may include other cryogenic fluids, such as liquid argon or liquid carbon dioxide. It is further contemplated that other examples of the system can have any number of liquid supply lines and/or vapor supply lines.

The system 100 further includes a valve 172 coupled to at least one of the liquid supply line 164 and the vapor supply lines 166, 168, 170. The valve 172 being movable between a closed position and an open position for flowing the cryogenic fluid from the storage tank 152 to the nozzles 146, 148, 150. In one non-limiting example, the valve 172 is a solenoid valve 174. However, it is contemplated that the system can include any suitable valve.

The system 100 further includes a computer 176 having a processor 178 coupled to at least the pump 154 and the valve 172. The computer 176 further includes a memory 180 having instructions such that the processor 178 is programmed to generate an actuation signal. The valve 172 moves to the open position, and the pump 154 pumps the cryogenic fluid from the storage tank 152 to the nozzles 146, 148, 150, in response to the valve 172 and the pump 154 receiving the actuation signal from the processor 178.

Computers and computing devices generally include computer executable instructions, where the instructions may be executable by one or more computing devices such as those listed above. Computer executable instructions may be compiled or interpreted from computer programs created using a variety of programming languages and/or technologies. Some of these applications may be compiled and executed on a virtual machine. In general, the processor 178 (e.g., a microprocessor) receives instructions, e.g., from memory 180, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory 180 may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Figure 6:
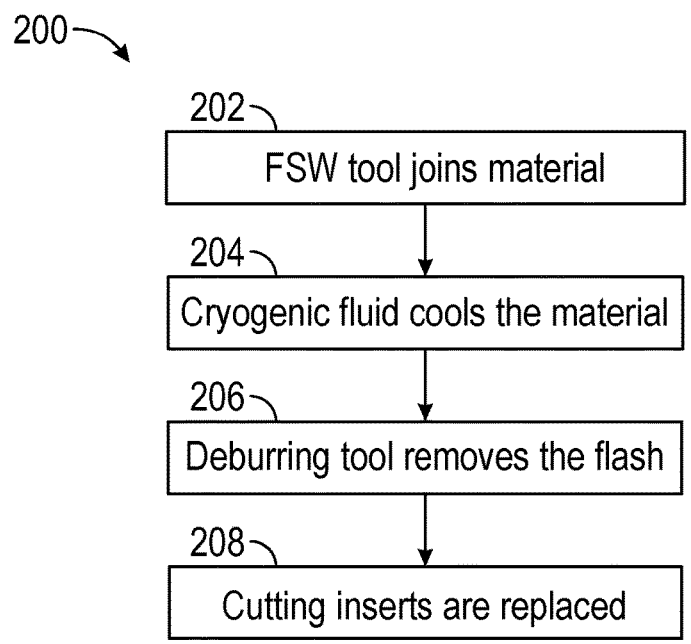
FIG. 6 is a flow chart of one exemplary method of operating the welding and deburring system of FIG. 1.

Referring now to FIG. 6, a method 200 of operating the system 100 of FIG. 1 is provided. The method 200 commences at block 202 with the FSW tool 106 joining the first and second work pieces 102, 104 to one another at the weld 108. This step can be accomplished by using the FSW tool 106 for at least one of friction stir processing, friction stir spot welding, friction stir spot joining, friction bit joining, friction stir fabrication and friction stir mixing the first and second work pieces 102, 104 to one another. In one non-limiting example, the pin 122 plunges into the first and second work pieces 102, 104 and rotates to generate frictional heat, that in turn causes the material to soften without reaching a melting point. The FSW tool 106 is moved transversely along the joint line 124, thereby creating the weld 108 or bead as the plasticized material flows around the pin 122 from a leading edge to a trailing edge along a joint line 124.

At block 204, the nozzles 146, 148, 150 deliver the cryogenic fluid to at least one of the FSW tool 106, the deburring tool 126, the first work piece 102, the second work piece 104, and the weld 108. In this non-limiting example, the processor 176 generates an actuation signal, in response to, for example, a technician operating a Human Machine Interface coupled to the processor 176. The valve 172 moves to the open position, and the pump 154 pumps the cryogenic fluid from the storage tank 152 to the nozzles 146, 148, 150, in response to the valve 172 and the pump 154 receiving the actuation signal from the processor 176.

At block 206, the deburring tool 126 removes the material flash and burrs from at least one of the weld 108 and the first and second work pieces 102, 104. In this example, this step can be accomplished by the floating double collar configuration rotating the first collar 112 of the FSW tool 106, which in turn rotates the second collar 114 of the deburring tool 126. The second collar 114 is disposed about the first collar 112, and pivots relative to the first collar 112, such that the second collar 114 remains parallel to the first and second work pieces 102, 104. The second collar 114 can pivot on the rocker pins 142, 144 that are coupled to a pair of diametrically sides of the first collar 112. Also, in this non-limiting example, the load pin 128 is coupled to the second collar 114 for setting the cutting depth of the cutting inserts 130 that are attached to the second collar 114. It is contemplated that other examples of the method do not include the floating double collar configuration with first and second collars pivoting relative to one another to adjust the positions of the FSW tool and the deburring tool relative to one another.

At block 208, the cutting inserts 130 are replaced with a replacement cutting insert in response to one of the processor 178, a user, and a sensor (not shown) determining that the associated cutting insert is worn, broken, or missing.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A welding and deburring system for joining first and second work pieces to one another, the system comprising:
   a friction stir welding tool for joining the first and second work pieces to one another at a weld;
   a deburring tool attached to the friction stir welding tool and removing a material flash generated at the weld in response to the friction stir welding tool joining the first and second work pieces together;
   at least one nozzle disposed in a fixed position relative to the friction stir welding tool, with the at least one nozzle for directing a cryogenic fluid to at least one of the friction stir welding tool, the deburring tool, the first work piece, the second work piece, and the weld;
   a storage tank for storing the cryogenic fluid;
   a pump for pumping the cryogenic fluid from the storage tank to the at least one nozzle, with the pump including an inlet and at least one outlet;
   a liquid supply line fluidly connecting the storage tank to the inlet of the pump;
   a vapor supply line fluidly connecting the at least one outlet of the pump to an associated one of the at least one nozzle;
   a valve coupled to at least one of the vapor supply line and the liquid supply line, with the valve being movable between a closed position and an open position for flowing the cryogenic fluid from the storage tank to the at least one nozzle;
   a computer comprising a processor coupled to at least the pump, the valve, and a memory having instructions such that the processor is programmed to:
   generate an actuation signal, where the valve moves to the open position and the pump pumps the cryogenic fluid from the storage tank to the at least one nozzle in response to the valve and the pump receiving the actuation signal from the processor.

2. The welding and deburring system of claim 1 wherein the friction stir welding tool comprises:
   a shoulder having a shoulder tip;
   a probe extending from the shoulder tip; and
   a first collar disposed about the shoulder.

3. The welding and deburring system of claim 2 wherein the deburring tool comprises:
   a second collar disposed about the first collar and pivotably coupled to the first collar; and
   at least one cutting insert releasably coupled to the second collar such that the at least one cutting insert engages the first and second work pieces during friction stir welding for removing the material flash.

4. The welding and deburring system of claim 3 wherein the deburring tool further comprises:
   a pair of rocker pins attaching the second collar to the first collar, such that the second collar remains parallel to a surface of the first and second work pieces while the friction stir welding tool and the first collar operate at an angle that is not perpendicular to the surface.

5. The welding and deburring system of claim 4 wherein the rocker pins are disposed through at least the first and second collars and disposed diametrically opposite to one another, such that the second collar is free to pivot on the rocker pins relative to the first collar.

6. The welding and deburring system of claim 5 wherein the deburring tool further comprises:
   a load pin coupled to a working end of the second collar for engaging the surface of at least one of the first and second work pieces and setting a cutting depth of the at least one cutting insert into the first and second work pieces.

7. The welding and deburring system of claim 6 wherein the at least one cutting insert is replaceable.

8. A method of operating a welding and deburring system the method comprising:
   providing a welding and deburring system for joining first and second work pieces to one another, the system comprising:
   a friction stir welding tool for joining the first and second work pieces to one another at a weld;
   a deburring tool attached to the friction stir welding tool and removing a material flash generated at the weld in response to the friction stir welding tool joining the first and second work pieces together;
   at least one nozzle disposed in a fixed position relative to the friction stir welding tool, with the at least one nozzle for directing a cryogenic fluid to at least one of the friction stir welding tool, the deburring tool, the first work piece, the second work piece, and the weld;
   a storage tank for storing the cryogenic fluid;
   a pump for pumping the cryogenic fluid from the storage tank to the at least one nozzle, with the pump including an inlet and at least one outlet;
   a liquid supply line fluidly connecting the storage tank to the inlet of the pump;
   a vapor supply line fluidly connecting the at least one outlet of the pump to an associated one of the at least one nozzle;
   a valve coupled to at least one of the vapor supply line and the liquid supply line, with the valve being movable between a closed position and an open position for flowing the cryogenic fluid from the storage tank to the at least one nozzle;
   a computer comprising a processor coupled to at least the pump, the valve, and a memory having instructions such that the processor is programmed to:
   generate an actuation signal, where the valve moves to the open position and the pump pumps the cryogenic fluid from the storage tank to the at least one nozzle in response to the valve and the pump receiving the actuation signal from the processor
   joining, using the friction stir welding tool, first and second work pieces to one another at the weld;

applying, using the at least one nozzle, the cryogenic fluid to at least one of the friction stir welding tool, the deburring tool, the first work piece, the second work piece, and the weld; and removing, using the deburring tool, the material flash from at least one of the weld and the first and second work pieces.

9. The method of claim 8 further comprising:

rotating a first collar of the friction stir welding tool;

rotating a second collar of the deburring tool, with the second collar disposed about the first collar; and pivoting the second collar relative to the first collar, such that the second collar is disposed parallel to the first and second work pieces.

10. The method of claim 9 further comprising:

pivoting the second collar on a pair of rocker pins coupled to a pair of diametrically sides of the first collar.

11. The method of claim 8 further comprising setting, using a load pin coupled to the second collar, a cutting depth of at least one cutting insert attached to the second collar.

12. The method of claim 8 further comprising replacing the at least one cutting insert with a replacement cutting insert.

13. The method of claim 8 further comprising performing, using the friction stir welding tool, at least one of friction stir processing, friction stir spot welding, friction stir spot joining, friction bit joining, friction stir fabrication and friction stir mixing, for joining the first and second work pieces to one another.

\* \* \* \* \*